United States Patent
Kamijo

(10) Patent No.: US 6,833,892 B2
(45) Date of Patent: Dec. 21, 2004

(54) LIQUID CRYSTAL DISPLAY DEVICE AND ELECTRONIC APPARATUS

(75) Inventor: Kimitaka Kamijo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/278,930

(22) Filed: Oct. 24, 2002

(65) Prior Publication Data

US 2003/0090607 A1 May 15, 2003

(30) Foreign Application Priority Data

Oct. 24, 2001 (JP) ........................................ 2001-326927

(51) Int. Cl.$^7$ .......................................... G02F 1/1335
(52) U.S. Cl. .................... 349/115; 349/98; 349/106; 349/113
(58) Field of Search .................... 349/113–115, 98, 349/106

(56) References Cited

U.S. PATENT DOCUMENTS 6,266,111 B1 * 7/2001 Kataoka et al. ............. 349/113
6,621,543 B2 * 9/2003 Moon ......................... 349/115
6,636,291 B2 * 10/2003 Van De Witte et al. ..... 349/187
2001/0055083 A1 * 12/2001 Jiang et al. ................. 349/115

FOREIGN PATENT DOCUMENTS

JP          A 10-339872          12/1998

* cited by examiner

Primary Examiner—Robert H. Kim
Assistant Examiner—Michael H Caley
(74) Attorney, Agent, or Firm—Oliff & Berridge

(57) ABSTRACT

The invention provides a liquid crystal display device that is excellent in presenting a bright and visible display in a wide viewing angle. A transflective layer formed of cholesteric liquid crystal layers, each having a plurality of unflat portions, and reflecting at least a portion of elliptically polarized light having a predetermined rotation direction, is arranged on the inner surface of a lower substrate. An upper-substrate side elliptically-polarized-light input device is arranged to allow elliptically polarized light to enter a liquid crystal layer from an upper substrate. The liquid crystal layer reverses the component of the elliptically polarized light which is incident during one of electric field applied state and electric field non-applied state, while not changing the component of the elliptically polarized light during the other of the electric field applied state and the electric field non-applied state.

14 Claims, 8 Drawing Sheets

RELATED ART

LIQUID CRYSTAL DISPLAY DEVICE AND ELECTRONIC APPARATUS

BACKGROUND OF THE INVENTION

1. Field of Invention

The present invention relates to a liquid crystal display device and electronic apparatus. Particularly, the invention relates to a liquid crystal display device having a cholesteric liquid crystal layer as a reflective layer or a transflective layer, and presenting excellent visibility with a bright display and a wide viewing angle.

2. Description of Related Art

Reflective-type liquid crystal display devices can be applied in a variety of mobile electronic apparatus because they do not have a light source, such as a backlight, and thus they consume less power. Reflective-type liquid crystal display devices take advantage of ambient light, such as natural light or illumination light, but are difficult to view under dark conditions. Liquid crystal display devices have been proposed which use ambient light under light conditions as in an ordinary reflective-type liquid crystal display device, while presenting a display via an internal light source under dark conditions. This type of liquid crystal display device employs a reflective and transmissive display method. Depending on the ambient light level, the device switches between a reflective mode and a transmissive mode. The device presents a distinct display under dark conditions while saving power. In this specification, this type of liquid crystal display device is referred to as a "transflective-type liquid crystal display device."

In one proposed transflective-type liquid crystal display device, a reflective layer, formed of a metal film of aluminum or the like and having slits (apertures), is arranged on the inner surface of a lower substrate (in this specification, one surface of the substrate facing the liquid crystal is referred to as an "inner surface", and the other surface of the substrate opposite from the inner surface is referred to as an "outer surface"), and the reflective layer functions as a transflective layer.

FIG. 11 illustrates a related art transflective liquid crystal display device having this type of transflective layer.

The liquid crystal display device 100 includes liquid crystal cells including a liquid crystal 103 between a pair of transparent substrates 101 and 102. A reflective layer 104 and an insulator 106 are laminated on the lower substrate 101. A lower electrode 108, which is an electrically conductive transparent layer fabricated of indium tin oxide (hereinafter referred to ITO), is formed on the insulator 106. An alignment layer 107 is formed to cover the lower electrode 108. On the other hand, a color filter 109 having color layers of R (red), G (green), and B (blue) is formed on the upper substrate 102. A planarization layer 111 is laminated on the color filter 109. Upper electrodes 112, fabricated of electrically conductive transparent film, such as of ITO, is formed on the planarization layer 111. An alignment layer 113 is then deposited to cover the upper electrodes 112.

The reflective layer 104 is fabricated of a metal, having a high light reflectance, such as aluminum, and has a slit 110 to transmit light for each pixel. Through the slit 110, the reflective layer 104 can function as a transflective layer (hereinafter, the reflective layer 104 is referred to as a "transflective layer"). Arranged on the outer surface of the upper substrate 102 are a forward diffuser 118, a retardation film 119, and an upper polarizer 114 in that order from the upper substrate 102. Arranged on the outer surface of the lower substrate 101 are a ¼-wave plate 115, and a lower polarizer 116 in that order from the lower substrate 101. A backlight 117 (an illumination device) is arranged beneath the lower polarizer 116 below the bottom surface of the lower substrate 101.

When the liquid crystal display device 100 shown in FIG. 11 is used in a reflective mode under light conditions, external light, such as sunlight or illumination entering from above the upper substrate 102, is transmitted through the liquid crystal 103, is reflected from the surface of the transflective layer 104 on the lower substrate 101, is transmitted through the liquid crystal 103 again, and then exits toward the upper substrate 102. When the liquid crystal display device 100 is used in a transmissive mode under dark conditions, light emitted from the backlight 117 arranged below the lower substrate 101 is passed through the slit 110 of the transflective layer 104, is transmitted through the liquid crystal 103, and then exits toward the upper substrate 102. These list rays contribute to image displaying in each mode.

In the transflective-type liquid crystal display device and the reflective-type liquid crystal display device, a metal film having a high light reflectance, such as aluminum or silver, has been used in the related art for the reflective layer or the transflective layer. A dielectric mirror can be formed of a laminate of dielectric thin films having different refractive indices, a reflective cholesteric plate formed of a cholesteric liquid crystal, or a reflective hologram plate using a hologram element is used for the reflective layer in the reflective-type liquid crystal display device. These reflective plates not only reflect light, but also have other functions.

In particular, the cholesteric liquid crystal exhibits a liquid crystal phase above a certain temperature (liquid crystal transition temperature), in which liquid crystal molecules take a cyclical helical structure configuration with a constant pitch. This structure has the property that the cholesteric liquid crystal selectively reflects light having a wavelength coinciding with the helical pitch thereof while transmitting light having other wavelengths. The helical pitch is controlled by the intensity of ultraviolet light or temperature at the curing of the liquid crystal. The color of reflected light is localized, and the cholesteric liquid crystal is thus used as a reflective-type color filter.

If a plurality of cholesteric liquid crystal layers reflecting light rays of different colors are laminated, the cholesteric liquid crystal layers function as a reflective plate that reflects white light.

The reflective plate using the cholesteric liquid crystal has the characteristic functions as described above. In comparison with the widely used metals in the related art, the cholesteric liquid crystal accomplishes a very bright and pure-color display. The reflective plate using the cholesteric liquid crystal can be used to enhance image quality on a reflective-type or transflective-type liquid crystal display device.

SUMMARY OF THE INVENTION

When a reflective cholesteric plate is used as a reflective layer to enhance the image quality on a reflective-type liquid crystal display device, a viewing angle of the screen is narrow compared with a related art display using a metal layer. Since the reflective cholesteric plate exhibits a sharp directivity in reflected light beams, a display much brighter than a related art display is obtained when a user views the screen of the liquid crystal display device within a limited narrow angle range. When a user changes the user's viewing position, the screen suddenly becomes darker.

In a related art transflective liquid crystal display device shown in FIG. 11, the user views the display regardless of the presence or absence of ambient light. The lightness level of the screen during the transmissive mode is significantly lower than that during the reflective mode. This is attributed to the fact that the display during the transmissive mode uses only half the light beams emitted from a backlight, that the display during the transmissive mode uses the light beams passed through the slits of the transflective layer, and that the ¼-wave plate and the lower polarizer are arranged on the outer surface of the lower substrate.

In the related art transflective liquid crystal display device, the display mode changes between during reflection and during transmission of light. During transmission, approximately half the light emitted from the backlight is absorbed by the upper polarizer, and approximately remaining half of the emitted light is used to provide display. Specifically, linearly polarized light incident from the upper substrate is fully used for light display during the reflective mode. During the transmissive mode, light traveling from the lower surface of the liquid crystal layer to the upper substrate must be substantially circularly polarized to present a display of the same lightness level as that presented during the reflective mode. Since approximately half the circularly polarized light is absorbed by the upper polarizer when the light exits from the upper substrate. As a result, approximately only half the light incident on the liquid crystal layer contributes to image displaying. In the basic principle, the related art transflective liquid crystal display device inherently provides a dark display during the transmissive mode.

During the transmissive mode, the display is presented making use of light passed through the slits. The area of the slit to the entire area of the transflective layer (namely, an aperture ratio) determines the lightness level of the display. If the aperture ratio is increased, the display becomes bright during the transmissive mode. With a high aperture ratio, however, the non-aperture area of the transflective layer decreases, darkening the display during the reflective mode. To assure the brightness of the display during the reflective mode, the aperture ratio of the slits must not be increased above a certain limit. The brightening of the display during the transmissive mode is thus subject to a limitation.

The basic principle of the transflective-type liquid crystal display device requires the use of the ¼-wave plate on the outer surface of the lower substrate. The reason why the liquid crystal display device lacks brightness because of the ¼-wave plate during the transmissive mode is discussed. In the discussion that follows, a dark display is presented with a non-selection voltage applied state while a light display is presented with a selection voltage applied state.

A dark display during the reflective mode in the transflective liquid crystal display device 100 illustrated in FIG. 11 is explained. When the transmission axis of the upper polarizer 114 is parallel with the plane of the page, the light incident on the outer surface of the upper substrate 102 from outside becomes linearly polarized light having the polarization axis parallel with the plane of the page when being transmitted through the upper polarizer 114 over the upper substrate 102, and then becomes generally circularly polarized light through birefringence of the liquid crystal 103 when being transmitted through the liquid crystal 103. The light becomes reverse circularly polarized light when being reflected from the surface of the transflective layer 104 on the lower substrate 101. When being transmitted through the liquid crystal 103 again, the light becomes linearly polarized light having the polarization axis perpendicular to the plane of the page, and then reaches the upper substrate 102. Since the upper polarizer 114 above the upper substrate 102 has the transmission axis thereof parallel with the plane of the page, the light reflected from the transflective layer 104 is absorbed by the upper polarizer 114, thereby failing to return to the outside of the liquid crystal display device 100 (to a viewer). The liquid crystal display device 100 thus presents a dark display.

When a light display is presented during the reflective mode, the alignment direction of the liquid crystal 103 is changed in response to the application of a voltage to the liquid crystal 103. Ambient light incident from outside the upper substrate 102 becomes linearly polarized light when being transmitted through the liquid crystal 103. The light is reflected from the transflective layer 104, and is transmitted through the upper polarizer 114 above the upper substrate 102 as linearly polarized light having the polarization axis parallel with the plane of the page, and then returns to the outside (to the viewer). The liquid crystal display device 100 thus presents a light display.

When a display is presented on the liquid crystal display device 100 during the transmissive mode, light emitted from the backlight 117 is incident on the liquid crystal cell from outside the lower substrate 101, and a portion of the light passed through the slits 110 contributes to image displaying.

To present a dark display on the liquid crystal display device 100, the light traveling from the slit 110 to the upper substrate 102 must be generally circularly polarized in the same manner as during the reflective mode as already described. Since the light emitted from the backlight 117 and passed through the slit 110 must be generally circularly polarized, the ¼-wave plate 115 is required to convert the linearly polarized light, after being transmitted through the lower polarizer 116, into generally circularly polarized light. The ¼-wave plate has the capability to convert the linearly polarized light into generally circularly polarized light at a certain wavelength.

A portion of light emitted from the backlight 117 but not passed through the slit 110 is discussed. When the transmission axis of the lower polarizer 116 is perpendicular to the plane of the page, the light emitted from the backlight 117 becomes linearly polarized light having the polarization direction perpendicular to the plane of the page when being transmitted through the lower polarizer 116. The linearly polarized light then becomes generally circularly polarized light when being transmitted through the ¼-wave plate 115, and reaches the transflective layer 104. When the light is then reflected from the bottom surface of the transflective layer 104, the light becomes reverse circularly polarized light. When being transmitted through the ¼-wave plate 115 again, the light becomes linearly polarized light having the polarization axis thereof parallel with the plane of the page. The linearly polarized light is then absorbed by the lower polarizer 116 having the transmission axis thereof perpendicular to the plane of the page. In other words, out of the light emitted from the backlight 117, the portion of the light not passed through the slit 110 is reflected from the bottom surface of the transflective layer 104, and is mostly all absorbed by the lower polarizer 116 below the lower substrate 101.

Almost all of the light that is not passed through the slit 110 and reflected from the transflective layer 104 during the transmissive mode is absorbed by the lower polarizer 116 below the lower substrate 101 in the transflective-type liquid crystal display device 100. This means that only a fraction of the light emitted from the backlight 117 contributes to image displaying. If the light emitted from the backlight 117 is transmitted through the lower polarizer 116 without being absorbed by the lower polarizer 116, and returns to the backlight 117, the light just emitted from the backlight 117 and the returning light effectively heighten luminance of the backlight 117. The lightness level during the transmissive mode is heightened. If the light that is not passed through the slit 110 and then reflected from the transflective layer 104 is reused, the lightness level during the transmissive mode is heightened. The related art cannot achieve the reuse of the reflected light.

The present invention has been developed to address or resolve this problem, and the present invention provides a reflective-type or a transflective-type liquid crystal display device employing a cholesteric liquid crystal layer as the reflective layer thereof and presenting an excellent visibility with a wide viewing angle and a bright display.

The present invention also provides electronic apparatus including the liquid crystal display device having excellent visibility.

To address or achieve the above advantages, a liquid crystal display device having a liquid crystal cell including an upper substrate, a lower substrate facing the upper substrate, and a liquid crystal layer encapsulated between the upper substrate and the lower substrate, includes a reflective layer formed of a cholesteric liquid crystal layer arranged on the inner side of the lower substrate, and having a plurality of unflat portions, to reflect at least a portion of elliptically polarized light having a predetermined rotation direction, and an upper-substrate side elliptically-polarized-light input device to cause elliptically polarized light to enter the liquid crystal layer from the upper substrate. The liquid crystal layer reverses the component of the elliptically polarized light that is incident during one of a selection electric field applied state and a non-selection electric field applied state, and does not change the component of the elliptically polarized light during the other of the selection electric field applied state and the non-selection electric field applied state.

The liquid crystal display device of the present invention employs the cholesteric liquid crystal layer as the reflective layer imparting a sharp directivity to the reflected light. However, since the cholesteric liquid crystal layer has the plurality of unflat portions, the elliptically polarized light having the predetermined rotation direction is scattered when being reflected by the reflective layer and output therefrom. In other words, when the cholesteric liquid crystal layer has a plurality of unflat portions, the helical structure of the liquid crystal molecules forming the cholesteric liquid crystal layer is inclined in a wide angle range. The light incident on the reflective layer is scattered when being reflected from the cholesteric liquid crystal layer, thereby being output as a light beam having a wide angle.

In this way, the liquid crystal display device of this invention provides an intensity distribution of the reflected light milder than that of the related art liquid crystal display device with the cholesteric liquid crystal layer having no unflat portions. The liquid crystal display device providing excellent legibility with a wide viewing angle and bright display results.

In the liquid crystal display device, the reflective layer preferably converges the reflected light in a predetermined angle range.

The direction in which the viewer views the display screen (namely, a direction facing the front of the viewer) is approximately normal to the plane of the substrate. In the above liquid crystal display device, the reflective layer converges the reflected light within a predetermined angle range. By converging the light reflected from the reflective layer in a direction approximately normal to the substrate, the amount of light reflected in a direction other than the direction in which the viewer views is reduced. The reflected light is thus effectively used as light contributing to an increase in the lightness level when the viewer views the display screen. An even brighter display results.

When the direction of the light reflected from the reflective layer agrees with the direction of light which is specularly reflected from the display screen of the liquid crystal display device, the light exiting from the liquid crystal display device superimpose the external light reflected from the surface of the liquid crystal display device, making the display less recognized. In the above-referenced liquid crystal display device, the reflective layer causes the direction of the reflected light to be different from the specular reflection direction on the surface of the liquid crystal display device. The liquid crystal display device thus presents a very recognizable display.

In the liquid crystal display device, the unflat portion of the cholesteric liquid crystal layer is preferably formed of a curved surface.

In this liquid crystal display device, light is effectively scattered when the light is reflected from the reflective layer. The intensity distribution of the reflected light becomes mild. As a result, the liquid crystal display device presents an excellent visibility with a wide viewing angle and bright display.

The liquid crystal display device preferably includes an underlayer having a plurality of unflat portions, beneath the cholesteric liquid crystal layer, on the side of the lower substrate.

In this liquid crystal display device, the cholesteric liquid crystal layer having the plurality of unflat portions is easily fabricated. The liquid crystal display device presenting an excellent visibility with a wide viewing angle and a bright display results.

In the liquid crystal display device, the underlayer is preferably fabricated of a resin.

In this liquid crystal display device, the configuration of the unflat portions of the underlayer is easily controlled. The unflat portion having an arbitrary configuration is easily formed. A plurality of unflat portions forming the cholesteric liquid crystal layer is easily formed. With the unflat portion appropriate for a wide viewing angle, a liquid crystal display device having an even better visibility is provided.

The liquid crystal display device may further include a color filter layer having a plurality of color layers containing pigments of different colors over the reflective layer on the side of the upper substrate.

The liquid crystal display device thus presents a color display.

Preferably, the liquid crystal display device further includes an illumination device to cause light to enter the liquid crystal cell through the lower substrate, and a lower-substrate side elliptically-polarized-light input device to cause elliptically polarized light to enter the liquid crystal layer from the lower substrate.

The liquid crystal display device of the present invention is embodied as a transflective-type liquid crystal display device with the lightness level equalized between during the transmissive display mode and the reflective display mode. To this end, some method is required to cause light to enter the liquid crystal cell through the lower substrate, and to cause elliptically polarized light to enter from the lower substrate toward the liquid crystal layer. Any method is acceptable. For example, a so-called backlight may be arranged as an illumination device to cause the light from the lower substrate to enter the liquid crystal cell. The light is thus easily incident from the lower substrate.

In the liquid crystal display device, the underlayer having the plurality of unflat portions presents a bright display in a wide viewing angle during the reflective mode for the reason described above. During the transmissive mode, the liquid crystal display device presents a bright display for the reason to be discussed below. In comparison with the related art transflective-type liquid crystal display device, the transflective-type liquid crystal display device of this invention presents an excellently visible display both during the reflective mode and during the transmissive mode.

The cholesteric liquid crystal has the so-called selective reflectivity in which the cholesteric liquid crystal selectively reflects circularly polarized light having the wavelength thereof equal to the helical pitch of the liquid crystal molecules and having the rotation in the same direction as that of the helical structure. In other words, circularly polarized light having a wavelength that is not equal to the helical pitch of the liquid crystal molecules and circularly polarized light having a wavelength equal to the helical pitch, but having the rotation in a direction reverse to that of the helical structure are transmitted through the cholesteric liquid crystal. The cholesteric liquid crystal layer here does not fully transmit the circularly polarized light having a wavelength equal to the helical pitch of the liquid crystal molecules and having a rotation in the same direction as that of the helical structure of the liquid crystal molecules. Specifically, the cholesteric liquid crystal layer reflects a portion of the circularly polarized light while transmitting the remaining portion of the circularly polarized light. In this way, the cholesteric liquid crystal layer functions as a transflective layer.

The inventors of the present invention have found that using the reflective layer of the cholesteric liquid crystal currently proposed in the reflective-type liquid crystal display device provides the following feature. When the light incident on the liquid crystal cell is elliptically polarized, and when the liquid crystal mode is set so that the component of the elliptically polarized light is reversed during one of the selection electric field applied period and the non-selection electric field applied period for the liquid crystal layer, the lightness level in the display mode is equalized between reflection and transmission, and the lightness level is not lowered in the basic principle during the transmissive mode. The inventors have also found that the light reflected from the lower substrate due to the selective reflection of the cholesteric liquid crystal is reused with the related art construction outside the lower substrate remaining unchanged. Based on these facts, the present invention has been proposed.

DETAILED DESCRIPTION OF PREFERRED EMBODIMENTS

The principle of the image displaying on the liquid crystal display device of the present invention and the reason why the light reflected from the transflective layer is reused are discussed below with reference to FIG. 3.

Figure 3:
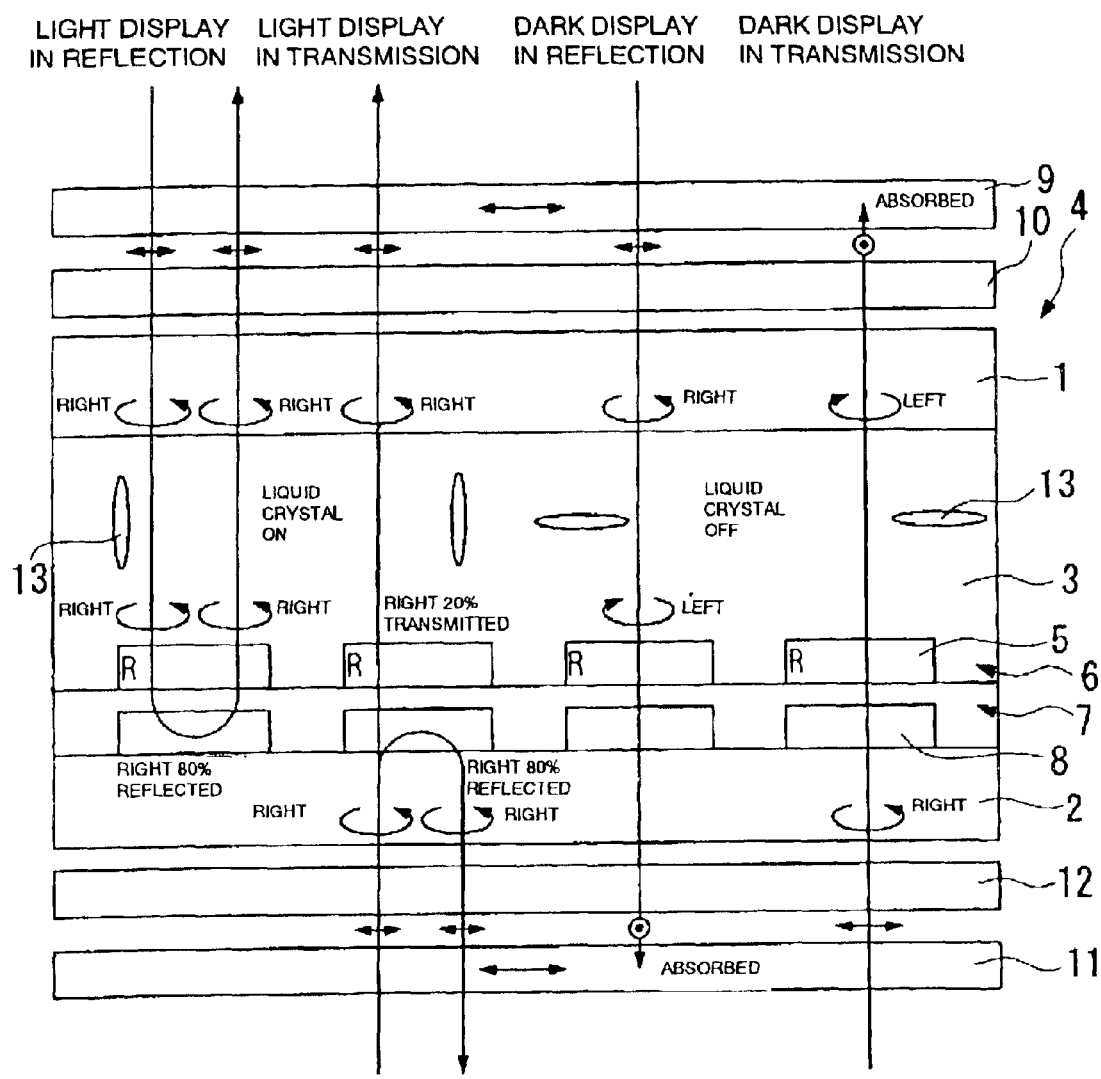
FIG. 3 is a schematic illustrating the principle of the liquid crystal display device for image displaying in accordance with the first embodiment of the present invention.

FIG. 3 is a schematic that illustrates the principle of the image displaying performed on the liquid crystal display device of the present invention.

A liquid crystal cell 4 is constructed by encapsulating a liquid crystal layer 3 between a pair of light-transmissive substrates, namely, an upper substrate 1 and a lower substrate 2. Arranged on the inner surface of the lower substrate 2 are a transflective layer 7 containing a cholesteric liquid crystal layer 8, and a color filter layer 6 (also hereinafter referred to as a "pigment color filter layer") having color layers 5 containing pigments (a red (R) color layer for example, in FIG. 3) in that order from the lower substrate 2. The cholesteric liquid crystal layer 8 reflects a portion of circularly polarized light having a predetermined wavelength band (color) and a predetermined rotation direction, while transmitting the remaining portion of the circularly polarized light. For example, in this embodiment, the cholesteric liquid crystal layer 8 reflects 80% of the clockwise rotating, circularly polarized light(hereinafter referred to as clockwise circularly polarized light) of red color while transmitting 20% of the clockwise circularly polarized light.

The liquid crystal display device of this invention includes an upper-substrate side elliptically-polarized-light input device to cause elliptically polarized light to enter the liquid crystal layer 3 from the upper substrate 1. Referring to FIG. 3, the upper-substrate side elliptically-polarized-light input device includes an upper polarizer 9 to transmit linearly polarized light in one direction, and an upper ¼-wave plate 10 to convert the linearly polarized light transmitted through the upper polarizer 9 to circularly polarized light. As shown, the liquid crystal display device of this invention also includes a lower-substrate side elliptically-polarized-light input device to cause elliptically polarized light from the lower substrate 2 to enter the liquid crystal layer 3. Like the side of the upper substrate 1, the lower-substrate side elliptically-polarized-light input device includes a lower polarizer 11 and a lower ¼-wave plate 12. On the upper substrate and the lower substrate, the transmission axes of the upper polarizer 9 and the lower polarizer 11 are aligned with a direction parallel with the plane of the page of FIG. 3. When the linearly polarized light aligned in this direction is incident on each of the upper ¼-wave plate 10 and the lower ¼-wave plate 12, clockwise circularly polarized light is output.

The liquid crystal layer 3 reverses the component of the circularly polarized light (the rotation direction) that is incident depending on the presence or absence of an electric field. For example, during the non-selection voltage applied state (with the liquid crystal set to be off), the liquid crystal layer 3 has a phase difference of $\lambda/2$ ($\lambda$:wavelength of the incident light) with the liquid crystal molecules 13 lying down. Clockwise circularly polarized light becomes counterclockwise circularly polarized light when being transmitted through the liquid crystal layer 3, and counterclockwise polarized light becomes clockwise polarized light when being transmitted through the liquid crystal layer 3. When the liquid crystal molecules 13 are in their upright position during the selection voltage applied state (with the liquid crystal set to be on), the liquid crystal layer 3 has no phase difference. The component (the rotation direction) of the circularly polarized light remains unchanged.

To present a light display during the reflective mode in the liquid crystal display device illustrated in FIG. 3 (shown on the left side of FIG. 3), the light to be incident on the upper substrate 1 from outside becomes linearly polarized light having the polarization axis parallel with the plane of the page when being transmitted through the upper polarizer 9 above the upper substrate 1, and then becomes clockwise circularly polarized light when being transmitted through the upper ¼-wave plate 10. With the liquid crystal set to be on, the rotation direction of the circularly polarized light remains unchanged unlike the above case. When the clockwise circularly polarized light is incident on the liquid crystal layer 3, the clockwise circularly polarized light remains unchanged when it reaches the transflective layer 7 after being transmitted through the liquid crystal layer 3.

The significant difference between the related art transflective layer employing a metal layer and the transflective layer employing the cholesteric liquid crystal is that the transflective layer employing the metal layer reverses the rotation direction of the circularly polarized light during the reflection, i.e., the clockwise circularly polarized light becomes counterclockwise circularly polarized light when being reflected from the metal layer, while the transflective layer employing the cholesteric liquid crystal keeps the rotation direction of the circularly polarized light unchanged when the light is reflected therefrom, namely, the rotation direction of the clockwise circularly polarized light remains clockwise even when the light is reflected. Therefore, 80% of the red clockwise circularly polarized light is reflected from the transflective layer 7 on the lower substrate 2, and is then transmitted through the liquid crystal layer 3 toward the upper substrate 1. Since the liquid crystal is on, the polarization state of the light remains unchanged from the clockwise direction. However, the light becomes linearly polarized light having the polarization axis parallel with the plane of the page when being transmitted through the upper ¼-wave plate 10. The linearly polarized light is transmitted through the upper polarizer 9, thereby returning to the outside (the viewer), and thereby presenting a light (red) display on the liquid crystal display device.

Conversely, when a dark display during the reflective mode (see a second light ray from the right in FIG. 3) is performed and when the liquid crystal is set to an off state, the liquid crystal layer 3 has a phase difference of $\lambda/2$. Clockwise circularly polarized light incident on the upper substrate 1 from above becomes counterclockwise circularly polarized light when being transmitted through the liquid crystal layer 3. Referring to FIG. 3, the cholesteric liquid crystal layer 8 forming the transflective layer 7 reflects a portion of the clockwise circularly polarized light, while transmitting counterclockwise circularly polarized light therethrough. Then, when being transmitted through the lower ¼-wave plate 12, the light becomes linearly polarized light having the polarization axis perpendicular to the plane of the page. This linearly polarized light does not return to the outside (the viewer) but is absorbed by the lower polarizer 11. A dark display is thus presented on the liquid crystal display device.

When a display is presented during the transmissive mode, the light emitted from the backlight enters the liquid crystal cell 4 from outside the lower substrate 2, and becomes light contributing to image displaying. To present a dark display during the transmissive mode (see the rightmost light ray in FIG. 3), substantially the same operation as that during the reflective mode is performed from the lower substrate 2 to the upper substrate 1. Specifically, referring to FIG. 3, like on the side of the upper substrate 1, the lower polarizer 11 and the lower ¼-wave plate 12 are arranged on the side of the lower substrate 2. Clockwise circularly polarized light is incident on the liquid crystal layer 3 from the lower substrate 2, and 20% of the light is transmitted through the transflective layer 7. With the liquid crystal set to be off, the light becomes counterclockwise circularly polarized light at the arrival thereof to the upper substrate 1. The counterclockwise circularly polarized light becomes linearly polarized light having the polarization axis perpendicular to the plane of the page when being transmitted through the upper ¼-wave plate 10. The linearly polarized light does not reach the outside (the viewer) but is absorbed by the upper polarizer 9. A dark display is thus presented on the liquid crystal display device.

When a light display is presented during the transmissive mode (a second light ray from the left in FIG. 3), the light incident from below the lower substrate 2 becomes linearly polarized light having the polarization axis parallel with the plane of the page when being transmitted through the lower polarizer 11, and then becomes clockwise circularly polarized light when being transmitted through the lower ¼-wave plate 12. Then, 20% of the output clockwise circularly polarized light is transmitted through the transflective layer 7 formed of the cholesteric liquid crystal, is transmitted through the color layer 5 of the pigment color filter layer 6, and is then output as red color, clockwise circularly polarized light. When the liquid crystal is on, 20% of the clockwise circularly polarized light reaches the upper substrate 1 still in that polarization state. The clockwise circularly polarized light becomes linearly polarized light having the polarization axis parallel with the plane of the page when being transmitted through the upper ¼-wave plate 10. The linearly polarized light is transmitted through the upper polarizer 9, returning to the outside (the viewer) and thereby presenting a light (red) display on the liquid crystal display device.

With the light display presented during the transmissive mode, the light becomes clockwise circularly polarized light when being transmitted through the lower ¼-wave plate 12. Then, 80% of the light output from the lower ¼-wave plate 12 is reflected downward from the transflective layer 7 including the cholesteric liquid crystal. As described above, the cholesteric liquid crystal in nature does not change the rotation direction of the reflected circularly polarized light. The reflected light is the clockwise circularly polarized light. The clockwise circularly polarized light becomes linearly polarized light having the polarization axis parallel with the plane of the page when being transmitted through the lower ¼-wave plate 12. The linearly polarized light is transmitted through the lower polarizer 11 having the transmission axis parallel with the plane of the page. When the linearly polarized light having the polarization axis in alignment with the transmission axis of the lower polarizer 11 exits from the lower substrate 2 in this way, the light is then reflected from a reflective plate arranged in the backlight, for example, and then reintroduced to the side of the liquid crystal cell 4 for reuse.

In case of a dark display, which is not yet discussed, during the transmissive mode, the light becomes clockwise circularly polarized light when being transmitted through the lower ¼-wave plate 12. Then, 80% of the light output from the lower ¼-wave plate 12 is reflected from the transflective layer 7 including the cholesteric liquid crystal. After being output outwardly of the liquid crystal cell 4 from the lower substrate 2, the light is then reintroduced into the liquid crystal cell 4 again. This light does not affect the dark display, because it is simply absorbed by the upper polarizer 9.

When a light display is presented during the reflective mode, 20% of clockwise circularly polarized light input from above is transmitted through the transflective layer 7. After being output to the outside of the liquid crystal cell 4 from the lower substrate 2, the light is then reintroduced into the liquid crystal cell 4. This light contributes to image displaying, thereby keeping the display bright during the reflective mode.

In the liquid crystal display device of the present invention, the same display mode can be used for reflection and transmission. Particularly, when a light display is presented during the transmissive mode, a portion of the light incident from the lower substrate side is not absorbed by the upper polarizer unlike in the related art transflective liquid crystal display device. Most of the light transmitted through the transflective layer fabricated of the cholesteric liquid crystal contributes to image displaying. The light reflected from the transflective layer fabricated of the cholesteric liquid crystal is reused to provide image display. The ratio of 80% for reflection to 20% for transmission at the cholesteric liquid crystal mentioned above is one example only, and any ratio of reflection to transmission may be used. At any ratio, the effect that the circularly polarized light transmitted through the transflective layer formed of the cholesteric liquid crystal is fully taken advantage of is combined with the effect that the circularly polarized light reflected from the transflective layer is reused. The lightness level in the display caused by the transmitted light is heightened while the lightness level in the display caused by the reflected light is maintained. The transflective-type liquid crystal display device providing an excellent visibility results.

In the above discussion, the light introduced from the upper substrate and the light introduced from the lower substrate are the "clockwise circularly polarized light" in an ideal arrangement. It is not necessary that the light be completely circularly polarized light in the operation of the liquid crystal display device of the present invention. In a broad sense, any "elliptically polarized light" is acceptable.

In the liquid crystal display device, the cholesteric liquid crystal layer preferably functions as a color filter that selectively reflects color light rays having different wavelengths corresponding to helical pitches of liquid crystal molecules for predetermined regions into which a display area of the liquid crystal cell is divided.

The helical pitch of the liquid crystal molecules is changed every predetermined region into which the display area of the liquid crystal cell is divided, and light having a wavelength corresponding to the helical pitch is selectively reflected every predetermined region. The cholesteric liquid crystal layer thus functions as a reflective color filter. For example, each dot in the display area functions as a reflective-type color filter for red (R), green (G), or blue (B). The liquid crystal display device thus presents a color display different in color from dot to dot in the display area.

When the cholesteric liquid crystal layer functions as a color filter, the liquid crystal display device preferably includes a partitioning wall which is arranged at a position corresponding to the periphery of a predetermined region on the reflective layer into which the display area of the liquid crystal cell is divided. The partitioning wall is set to be higher in level than a peak of the unflat portion of the cholesteric liquid crystal layer. The partitioning wall partitions the cholesteric liquid crystal layer at every helical pitch of liquid crystal molecules.

The cholesteric liquid crystal layer functions as a reflective-type color filter to reflect red (R), green (G), and blue (B) color light rays in respective dots in the display area. The partitioning wall, arranged at the position corresponding to the periphery of each dot, is set to be higher in level than the peak of the unflat portion forming the cholesteric liquid crystal layer. The partitioning wall partitions the cholesteric liquid crystal layer at every helical pitch of liquid crystal molecules. The cholesteric liquid crystal layers to reflect different color light rays are formed within the corresponding regions defined by the partitioning walls on the reflective layer, respectively. In this way, adjacent regions are reliably separated. The liquid crystal display device presents a color display in color reproduction.

In the liquid crystal display device, the reflective layer may include a plurality of cholesteric liquid crystal layers having different helical pitches of the liquid crystal molecules.

In this liquid crystal display device, the reflective layer functions as a reflective layer which reflects circularly polarized light of a variety of wavelengths, namely, as a white-color reflective plate.

To address or achieve the above advantages, electronic apparatus of the present invention may include the liquid crystal display device described above.

The electronic apparatus thus includes a liquid crystal display presenting excellent visibility.

First Embodiment

A first embodiment of the present invention is discussed below with reference to FIG. 1.

Figure 1:
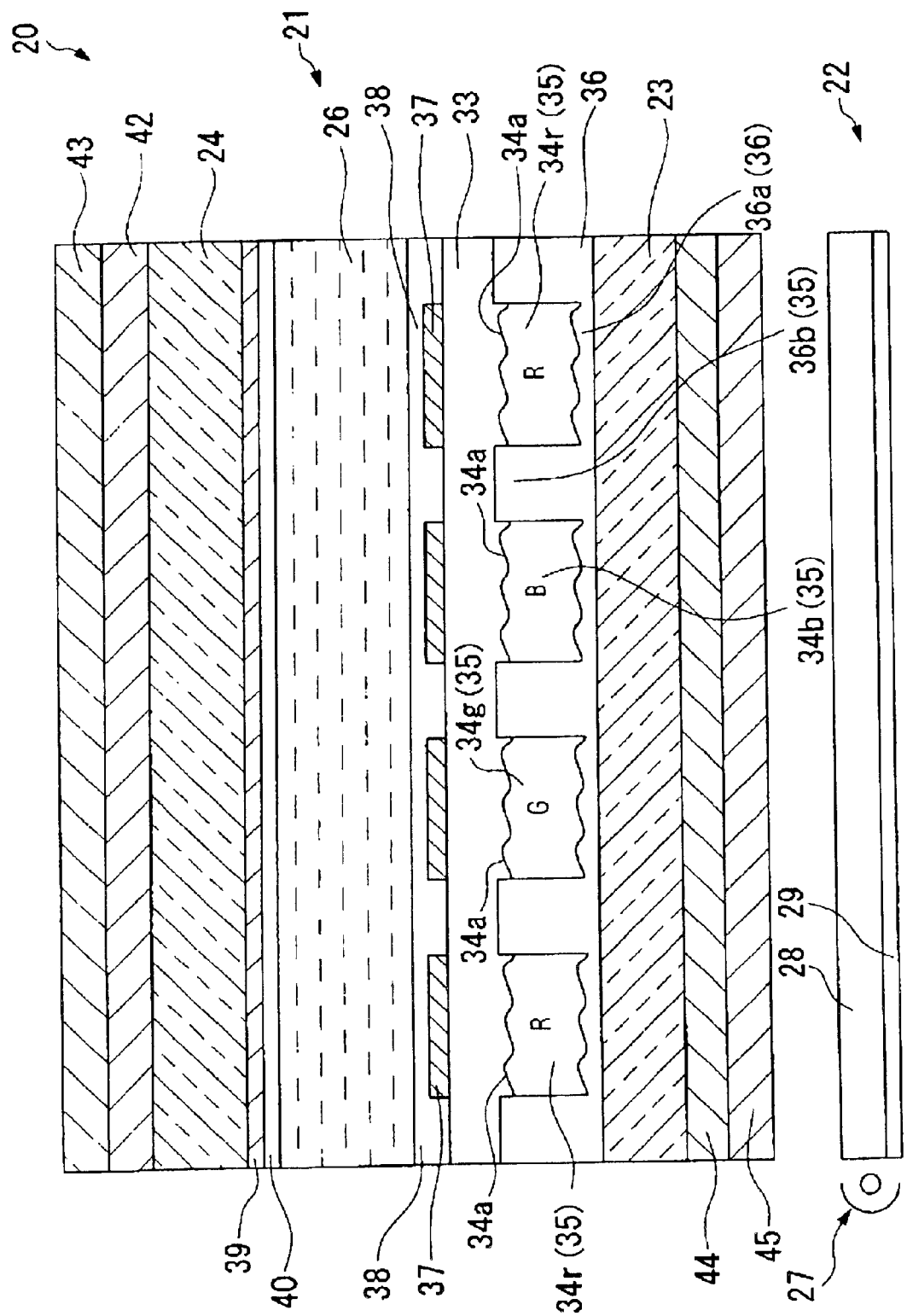
FIG. 1 is a cross-sectional view of a liquid crystal display device in accordance with a first embodiment of the present invention.

FIG. 1 is a cross-sectional view of a liquid crystal display device of this embodiment. The first embodiment is a transflective-type color liquid crystal display device with a cholesteric liquid crystal layer functioning as a color filter. Referring to FIG. 1, the thicknesses and the ratio of dimensions of the components are differentiated as necessary to simplify the viewing of the drawing.

A liquid crystal display device 20 of the present invention includes a liquid crystal cell 21, and a backlight 22 (an illumination device) arranged on the back side of the liquid crystal cell 21 (on the outer surface of a lower substrate 23).

The liquid crystal cell 21 includes the lower substrate 23 and an upper substrate 24 facing thereto. A liquid crystal layer 26 fabricated of STN (Super Twisted Nematic) having a phase difference of λ/2 is encapsulated between the upper substrate 24 and the lower substrate 23. The backlight 22 includes a light source 27, such as LED (Light Emitting Diode), a light guide 28, and a reflective plate 29.

Referring to FIG. 1, an underlayer 36 fabricated of a resin and having a plurality of unflat portions 36a formed of curved surfaces is arranged on the inner surface of the lower substrate 23 fabricated of a light-transmissive material, such as glass or plastic. Arranged on the underlayer 36 is a transflective layer 35 formed of partitioning walls 36b, and cholesteric liquid crystal layers 34r, 34g, and 34b defined by the partitioning walls 36b.

Figure 2:
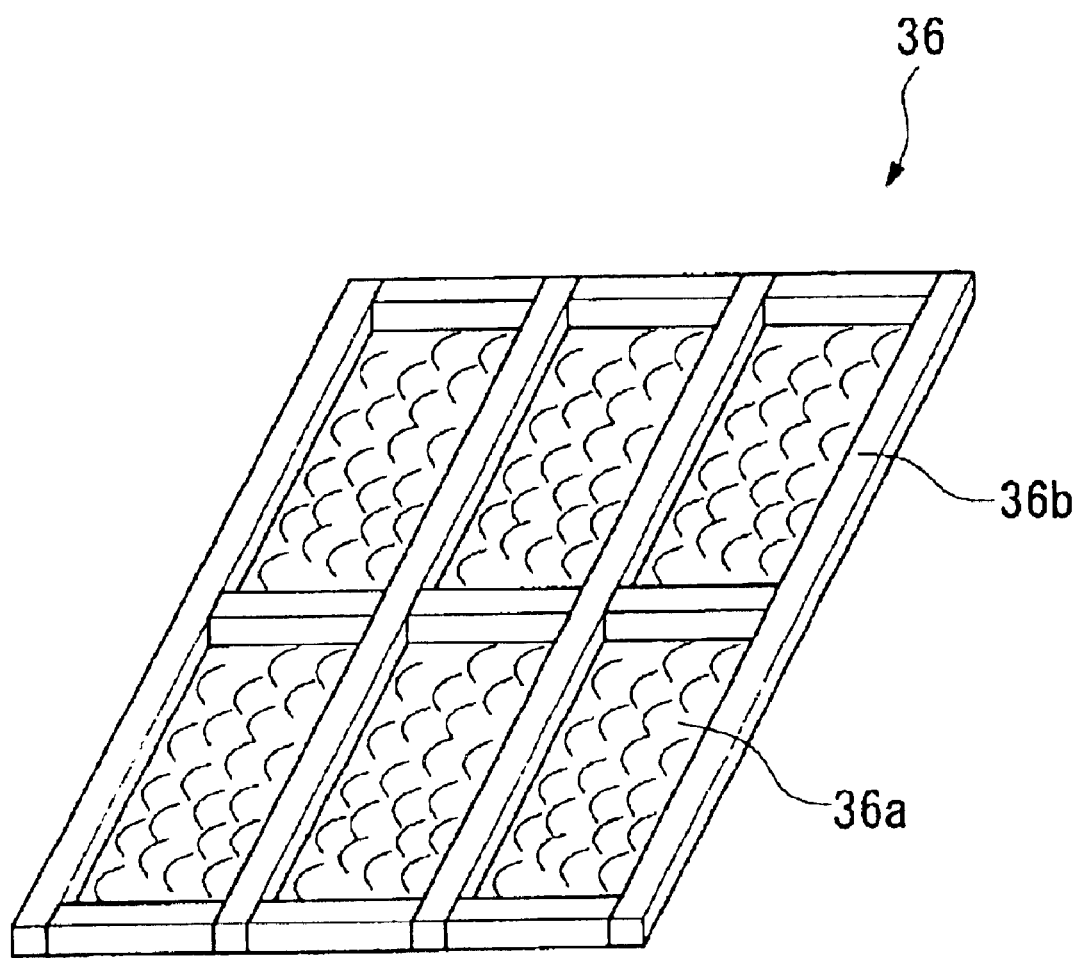
FIG. 2 is a perspective view of the liquid crystal display device diagrammatically illustrating an unflat portion and partitioning walls.

Referring to FIG. 1 and FIG. 2, the partitioning walls 36b are configured in a grid at a position corresponding to the periphery of each dot in the display area. The partitioning wall 36b is a projection in cross section, and is higher in level than the peak of the unflat portion 34a forming the cholesteric liquid crystal layers 34r, 34g, and 34b. The partitioning walls 36b are formed together with and integrally with the underlayer 36.

Each of the cholesteric liquid crystal layers 34r, 34g, and 34b reflects a portion of the respective circularly polarized light having a predetermined rotation direction while transmitting the remaining portion of the respective circularly polarized light. Specifically, the cholesteric liquid crystal layer reflects 80% of the respective circularly polarized light while transmitting 20% of the respective circularly polarized light. The ratio of reflection to transmission falls within a range of reflection:transmission ratio=8:2 to 1:9. The setting of the ratio is controlled by the thickness of the cholesteric liquid crystal layers 34r, 34g, and 34b.

The cholesteric liquid crystal layers 34r, 34g, and 34b include a plurality of unflat portions 34a formed of curved surfaces, as shown in FIG. 1, so that the light reflected from the transflective layer 35 converges in a direction generally normal to the surface of the substrate (namely, a direction facing the front of the viewer).

Each of the cholesteric liquid crystal layers 34r, 34g, and 34b in the corresponding dot of the display area selectively reflects the respective light having the wavelength equal to the helical pitch of the liquid crystal molecules thereof. The cholesteric liquid crystal layers 34r, 34g, and 34b are partitioned by the partitioning walls 36b every helical pitch. The helical pitch of the cholesteric liquid crystal layers 34r, 34g, and 34b is controlled in a localized area by changing the intensity of ultraviolet light or temperature when the cholesteric liquid crystal is cured. If the helical pitch is controlled to approximately 450 nm, blue color light is selectively reflected from the cholesteric liquid crystal layer. If the helical pitch is controlled to approximately 550 nm, green color light is selectively reflected from the cholesteric liquid crystal layer. If the helical pitch is controlled to approximately 650 nm, red color light is selectively reflected from the cholesteric liquid crystal layer. Thus, a combination of these layers functions as a color filter.

The two-dimensional pattern of the cholesteric liquid crystal layers 34r, 34g, and 34b may be one of the related art layout patterns such as a stripe configuration, a mosaic configuration, and a delta configuration.

Referring to FIG. 1, an overcoat layer 33 is deposited on the transflective layer 35 for planarization. Lower electrodes 37, formed of an electrically conductive transparent layer fabricated of ITO, are arranged on the overcoat layer 33, and an alignment layer 38, fabricated of a resin such as polyimide, is arranged on the lower electrodes 37. An upper electrode 39, formed of an electrically conductive transparent layer fabricated of ITO, is arranged on the inner surface of the upper substrate 24. An alignment layer 40, fabricated of a resin such as the polyimide, is arranged beneath the upper electrode 39.

As an electrode structure formed of the lower electrodes 37 and the upper electrode 39, any of an active-matrix method using switching elements, such as thin-film transistors (TFTs) or thin-film diodes (TFDs), and a passive-matrix method may be used.

An upper retardation film 42 and an upper polarizer 43 (these components constitute the upper-substrate side elliptically-polarized-light input device) are arranged on the outer surface of the upper substrate 24 in that order from the substrate. Arranged on the outer surface of the lower substrate 23 are a lower retardation film 44 and a lower polarizer 45 (these components constitute lower-substrate side elliptically-polarized-light input device) from the lower substrate in that order. The retardation films 42 and 44 and the polarizers 43 and 45 allow circularly polarized light having a predetermined rotation direction to enter the liquid crystal layer 26. Based on the principle of the liquid crystal display device of the present invention to provide image displaying, the circularly polarized light incident from the upper substrate 24 and the circularly polarized light incident from the lower substrate 23 need to be approximately aligned in the rotation direction. To this end, the directions of the transmission axes of the upper polarizer 43 and the lower polarizer 45 need to be aligned substantially parallel with the plane of the page of FIG. 1. To impart a color compensation function to the retardation film on the side of the upper substrate 24, it is not necessary to use the ¼-wave film. The retardation film having any phase delay may be selected.

A process step of forming the underlayer 36 and the transflective layer 35 on the inner surface of the lower substrate 23 is discussed. This process step is a portion of the manufacturing process of the liquid crystal display device 20 of this embodiment shown in FIG. 1.

Method 1

A positive-type photosensitive resist OFPR-800 (tradename of Tokyo Ohka Kogyo Co., Ltd.) is applied on the inner surface of the lower substrate 23 using a spin coater, for example. The resist is then subjected to a prefiring process at a temperature of 90° C. for 10 minutes.

The photosensitive resist is then exposed to light using a gray mask with the exposure dose transitionally changed. Using a developer NMD-W (tradename of Tokyo Ohka Kogyo Co., Ltd.), the photosensitive resist is developed, and is then subjected to a firing process at a temperature of 250° C. The photosensitive resist is then fully cured. The underlayer 36 and the partitioning walls 36b are then concurrently produced.

In this method, the location and shapes of the plurality of unflat portions 36a having curved surfaces and the partitioning walls 36b, forming the underlayer 36, are three-dimensionally controlled in accordance with the pattern and light transmittance of the gray mask.

A method of controlling an irradiation dose of an electron beam using an electron beam exposure device, besides the method of using the gray mask, can be used to transitionally change the exposure dose for the photosensitive resist.

After producing the underlayer 36 and the partitioning walls 36b, the cholesteric liquid crystal is applied in a region partitioned by the partitioning walls 36b, and is then exposed to ultraviolet light to be cured. In this way, the cholesteric liquid crystal layers 34r, 34g, and 34b formed of the plurality of unflat portions 34a having curved surfaces corresponding to the unflat portion 36a of the underlayer 36 are produced. The transflective layer 35 thus results.

The principle of the liquid crystal display device 20 to provide image displaying has already been discussed in detail in the Summary of the Invention section of this application, and no further discussion thereof is provided here. As already discussed, the liquid crystal display device 20 according to the present embodiment uses the same display mode during the reflection and transmission. Particularly, when a light display is presented during the transmissive mode, a portion of the light incident from the lower substrate is not absorbed by the upper polarizer unlike in the related art transflective-type liquid crystal display device. Most of the light transmitted through the transflective layer 35 formed of the cholesteric liquid crystal layers 34r, 34g, and 34b contributes to image displaying. Light reflected from the transflective layer 35 formed of the cholesteric liquid crystal layers 34r, 34g, and 34b and not introduced into the liquid crystal layer 26 is reused in transmission display. The effect that the circularly polarized light transmitted through the transflective layer 35 formed of the cholesteric liquid crystal layers 34r, 34g, and 34b is fully taken advantage of is combined with the effect that the circularly polarized light reflected from the transflective layer 35 is reused. The lightness level in the display caused by the transmitted light is heightened while the lightness level in the display caused by the reflected light is maintained. The transflective-type liquid crystal display device providing an excellent visibility results.

The liquid crystal display device 20 of this embodiment employs the reflective layer of the cholesteric liquid crystal layer exhibiting a sharp directivity in the reflected light. However, each of the cholesteric liquid crystal layers 34r, 34g, and 34b has a plurality of unflat portions 34a. The elliptically polarized light having a predetermined rotation direction is scattered when being reflected from the transflective layer 35. Compared with the related art liquid crystal display device having no unflat portion on the cholesteric liquid crystal layer, the intensity distribution of the reflected light becomes milder. As a result, the liquid crystal display device 20 provides excellent visibility with a bright display in a wide viewing angle range.

The plurality of unflat portions 34a forming the cholesteric liquid crystal layers 34r, 034g, and 34b has a curved surface. When light is reflected from the transflective layer 35, the light reflected therefrom is scattered more efficiently. The intensity distribution of the reflected light becomes very mild. As a result, a bright display is presented in a wide viewing angle.

The plurality of unflat portions 34a of the cholesteric liquid crystal layers 34r, 34g, and 34b converges the reflected light within a particular angle range. The transflective layer 35 thus efficiently converges the reflected light in a direction generally normal to the surface of the substrate (namely, a direction facing the front of the viewer). The liquid crystal display device 20 presents a brighter and more visible display.

The state of light on the surface of the liquid crystal cell of the liquid crystal display device 20 of this embodiment is discussed below with reference to the drawings.

Figure 4:
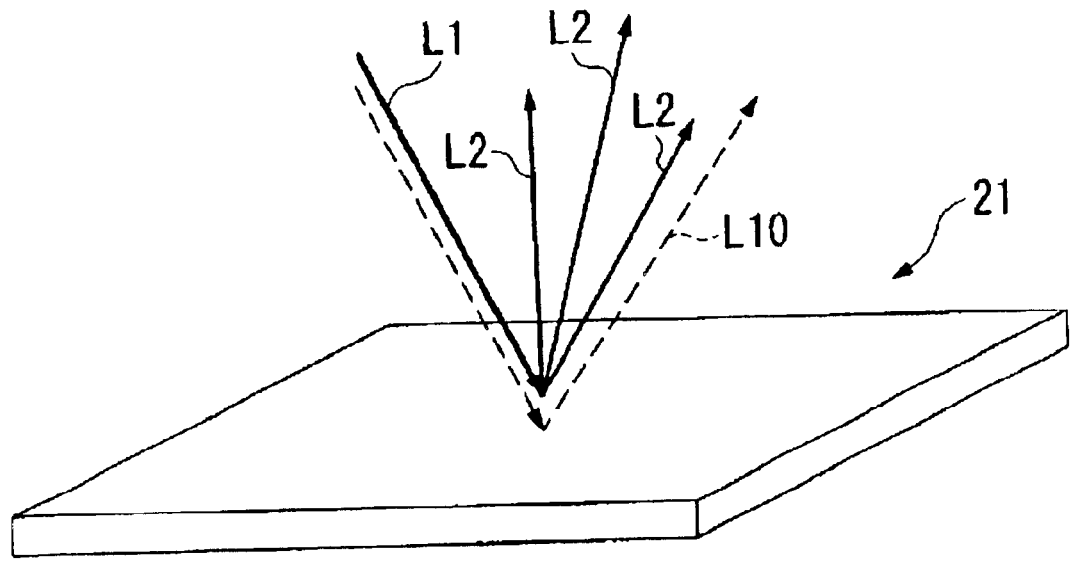
FIG. 4 is a schematic illustrating the state of light on the surface of a liquid crystal cell forming the liquid crystal display device of the present embodiment.
Figure 5:
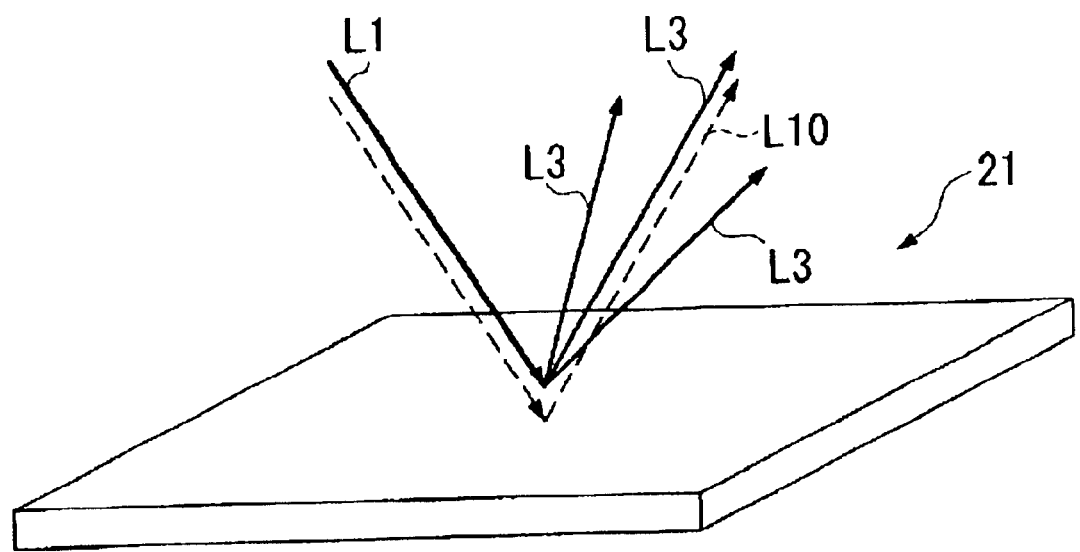
FIG. 5 is a schematic illustrating the state of light on the surface of the liquid crystal cell when the unflat portions of the cholesteric liquid crystal layer forming the liquid crystal display device of the present embodiment does not converge reflected light in a particular angle range.
Figure 10:
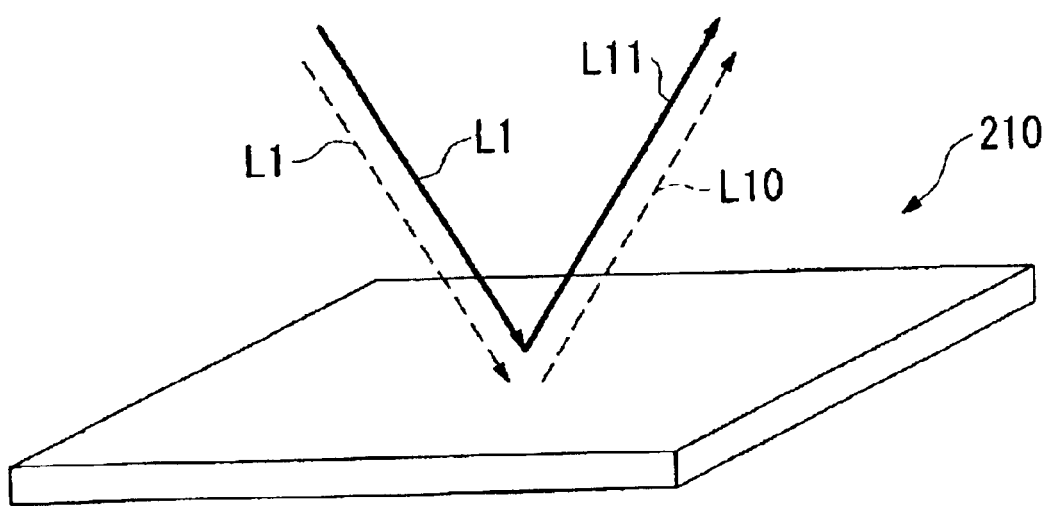
FIG. 10 is a schematic illustrating the state of light on the surface of a liquid crystal cell forming a conventional liquid crystal display device.
Figure 11:
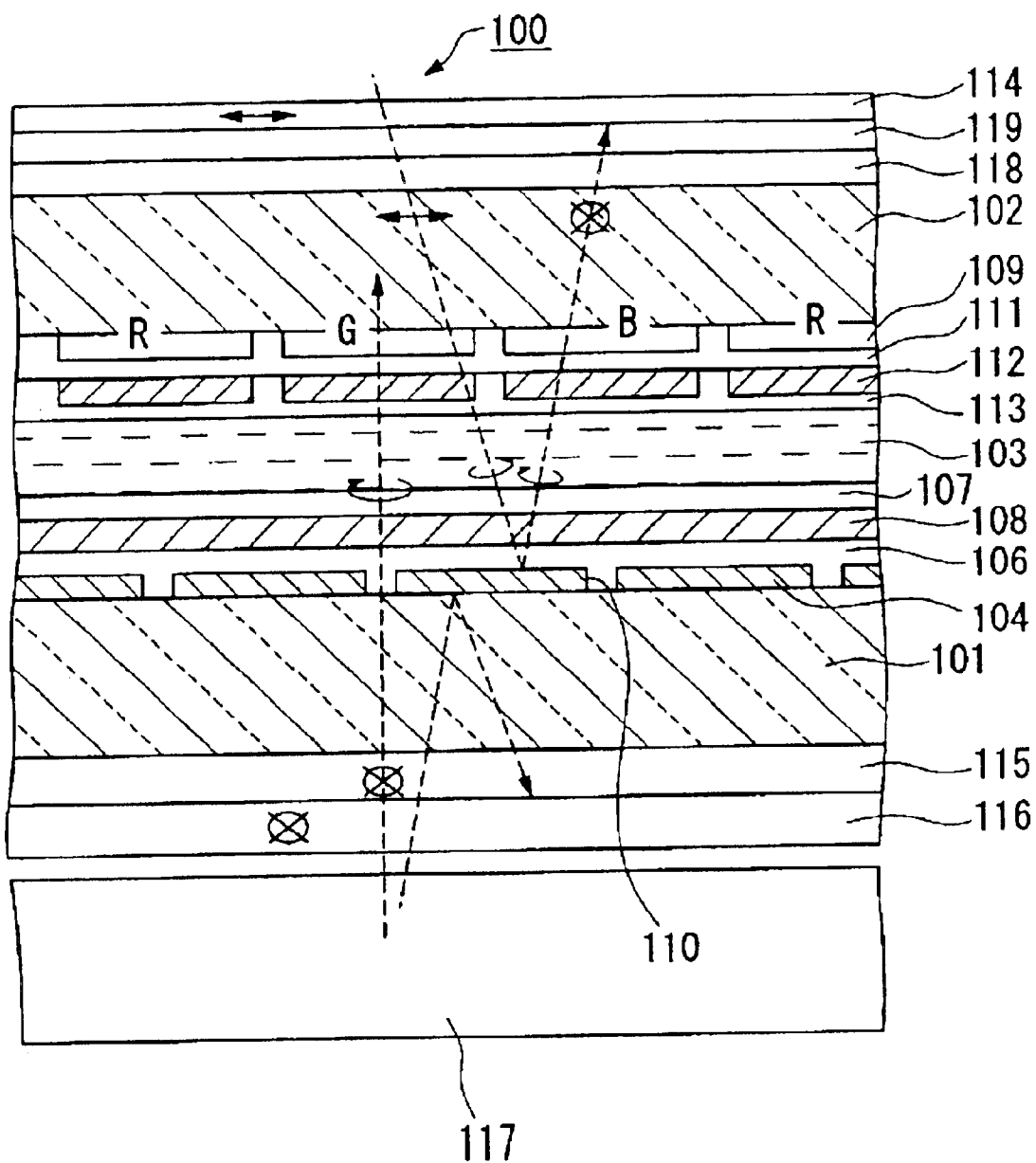
FIG. 11 is a cross-sectional view of a related art liquid crystal display device.

FIG. 4 is a schematic that illustrates the state of light on the surface of the liquid crystal cell 21 forming the liquid crystal display device 20 of this embodiment. FIG. 5 is a schematic that illustrates the state of light on the surface of the liquid crystal cell 21 when the unflat portion of the cholesteric liquid crystal layer forming the liquid crystal display device 20 of this embodiment does not converge the reflected light in a particular angle range. FIG. 10 is a schematic that illustrates the state of light on the surface of a liquid crystal cell 210 forming the conventional liquid crystal display device.

Referring to FIG. 4, FIG. 5 and FIG. 10, reference numeral L1 refers to external light incident on the liquid crystal cells 21 and 210, reference numerals L2, L3, and L11 refer to exiting light from the liquid crystal cells 21 and 210, and reference numeral L10 refers to the reflected light L10 of the external light reflected from the surface of the liquid crystal cells 21 and 210.

In the related art liquid crystal display device as shown in FIG. 10, the direction of the exiting light L11 from the liquid crystal cell 210, as the light reflected from the reflective layer, is the same as that of the reflected light L10 of the external light. For this reason, the exiting light L11 from the liquid crystal cell 210 superimposes the reflected light of the external light, thereby making the display less visible.

In the liquid crystal display device 20 of this embodiment, the direction of exiting light L2 from the liquid crystal cell 21, as the light reflected from the transflective layer 35, is different from that of the reflected light L10 of the external light, and is scattered in a plurality of directions as shown in FIG. 4. The liquid crystal display device 20 thus presents a bright and easy-to-see display in a wide viewing angle.

In the liquid crystal display device 20 of this embodiment, the unflat portions 34a forming the cholesteric liquid crystal layers 34r, 34g, and 34b converge the reflected light in a direction approximately normal to the substrate (namely, a direction facing the front of the viewer). In comparison with the arrangement in which the plurality of unflat portions 34a do not converge the reflected light in a particular angle range as shown in FIG. 5, the exiting light L2 from the liquid crystal cell 21 is collected more in a direction approximately normal to the substrate. The ratio of light amount reflected in a direction other than a direction in which the viewer views becomes small. The liquid crystal display device 20 thus presents a brighter and more visible display.

Since the liquid crystal display device 20 of this embodiment includes the underlayer 36 having the plurality of unflat portions 36a below the cholesteric liquid crystal layers 34r, 34g, and 34b, closer to the lower substrate 23. This arrangement facilitates the production of the cholesteric liquid crystal layers 34r, 34g, and 34b having the plurality of unflat portions 34a. The liquid crystal display device 20 presenting a bright and visible display in a wide viewing angle is thus easily produced.

Since the underlayer 36 is fabricated of a resin, the shape of the unflat portions 36a forming the underlayer 36 is easily controlled. The unflat portions 36a are easily formed into any shape. The unflat portions 36a forming the cholesteric liquid crystal layers 34r, 34g, and 34b are formed into any shape. The unflat portions 34a having an optimum shape to achieve a wide viewing angle are easily produced.

When the underlayer 36 is fabricated of a resin, the underlayer 36 may be produced in the following methods instead of the method 1.

Method 2

As in the method 1, the photosensitive resist discussed in the method 1 is applied on the inner surface of the lower substrate 23, and is then subjected to a pre-firing process at a temperature of 90° C. for 10 minutes to form a photosensitive resist layer.

A first exposure is performed using a mask. Then, using a developer NMD-W (tradename of Tokyo Ohka Kogyo Co., Ltd.), the photosensitive resist layer is developed. In this way, the developed photosensitive resist layer is removed. The unflat portions formed of the photosensitive resist are thus produced.

A second exposure is performed using a mask different from the one used in the first exposure. The light-shielding area of the mask is smaller than that of the mask for the first exposure.

Using a developer NMD-W (tradename of Tokyo Ohka Kogyo Co., Ltd.), the unflat portions including photosensitive resist are developed. In this way, the exposed resist portion is removed. An unflat portion having two steps, fabricated of the photosensitive resist, is formed on the lower substrate 23. In this example, the development is performed for each exposure. Alternatively, a single development may be performed after two exposure processes have been completed.

A heat treatment is performed at a temperature of 140° C. for 30 minutes to reflow the photosensitive resist over the unflat portion, thereby softening the steps of the unflat portion, and forming the unflat portion having a mildly curved surface. A firing process is then performed at a temperature of 250° C. to fully cure the photosensitive resist. The underlayer 36 having the unflat portion 36a formed of a curved surface thus results.

Method 3

As in the method 1, the photosensitive resist discussed in the method 1 is applied on the inner surface of the lower substrate 23, and is then patterned into a predetermined shape. Column-like unflat portion is formed.

A liquid material of photopolymerization acrylic resin is applied on the lower substrate 23 having the unflat portion formed thereon, and is then cured. The underlayer 36 having the unflat portion 36a formed of a curved surface covering the column-like unflat portions is thus obtained.

Method 4

A first film including a resin is formed on the lower substrate 23, and a photosensitive resist is applied on the first film, and is then patterned to a predetermined shape. Etching the first film, the column-like unflat portion is thus formed on the lower substrate 23.

The photosensitive resist is then peeled off. A liquid material of photopolymerization acrylic resin is applied on the lower substrate 23 having the unflat portion and is then cured. The underlayer 36 having the unflat portion 36a formed of a curved surface covering the column-like unflat portions is thus obtained.

When the underlayer 36 is fabricated of a resin, the underlayer 36 may be shaped using an embossing process. Alternatively, a mold having a shape copied from that of the underlayer 36 may be used.

The cholesteric liquid crystal layers 34r, 34g, and 34b function as a reflective-type color filter in which the dots in the display area respectively reflect light of red (R), green (G), and blue (B). The partitioning walls 36b, arranged at the position corresponding to the periphery of each dot, are set to be higher in level than the peak of the unflat portion 34a forming the cholesteric liquid crystal layers 34r, 34g, and 34b. The cholesteric liquid crystal layers 34r, 34g, and 34b are partitioned from each other at every helical pitch of the liquid crystal molecules. Each of the cholesteric liquid crystal layers 34r, 34g, and 34b to reflect light of different colors is formed in the region partitioned by the partitioning walls 36b in the transflective layer 35. Thus, one region is reliably isolated from the next region. The liquid crystal display device 20 presents a color display excellent in color reproduction.

Second Embodiment

A second embodiment of the present invention is discussed below with reference to FIG. 9.

Figure 9:
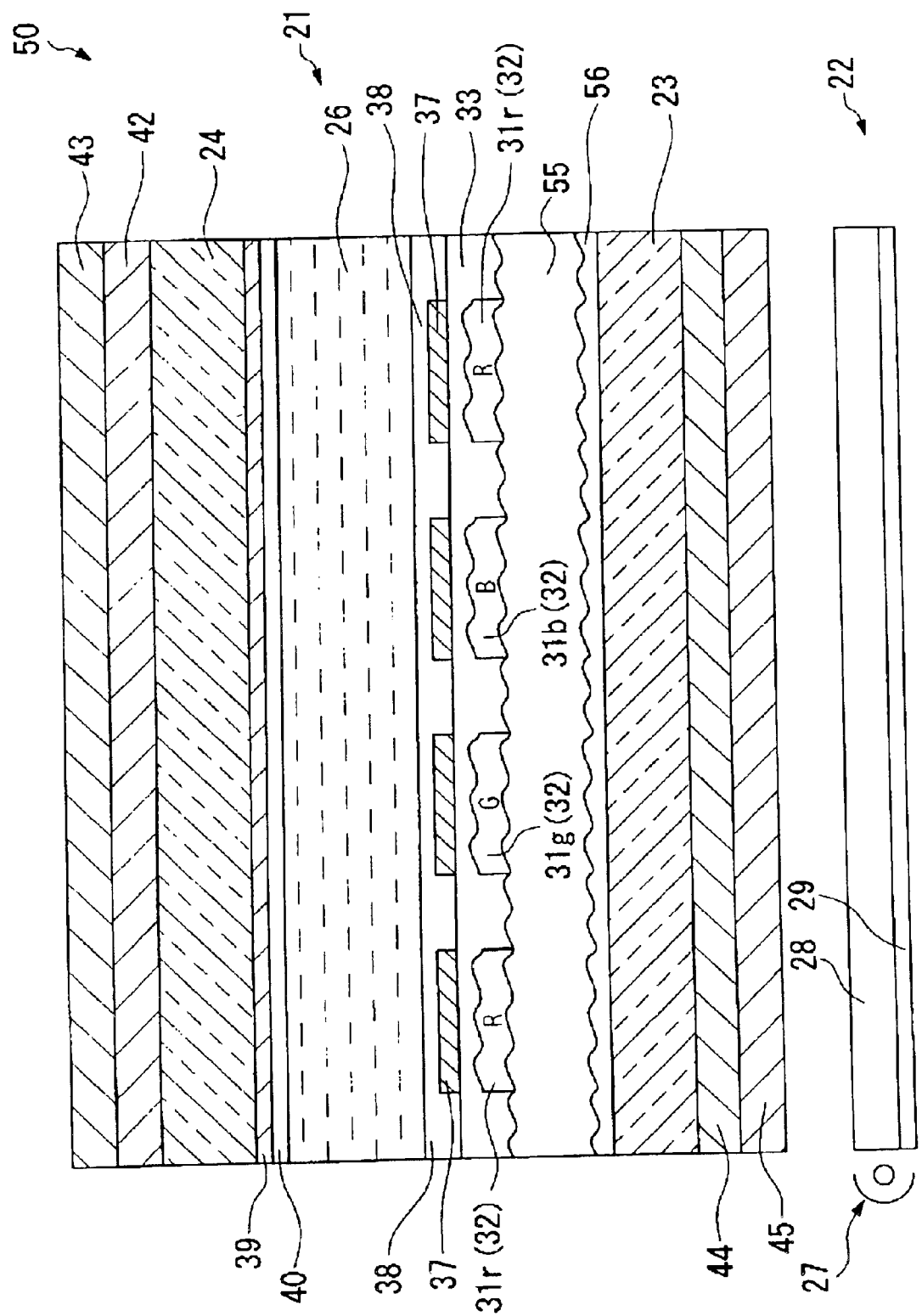
FIG. 9 is a cross-sectional view of the liquid crystal display device in accordance with a second embodiment of the present invention.

FIG. 9 is a cross-sectional view of the liquid crystal display device of the second embodiment. The second embodiment relates to a transflective-type color liquid crystal display device like the first embodiment. The second embodiment is different from the first embodiment in that the cholesteric liquid crystal layer functions as a white color reflective film. In FIG. 9, as in FIG. 1, the thickness and ratio of dimensions of components are differentiated as necessary to simplify the viewing of FIG. 9.

The general construction of the liquid crystal display device of the second embodiment remains unchanged from that of the first embodiment illustrated in FIG. 1. Only components different from those in the first embodiment are discussed with reference to the drawing in detail.

The difference of the liquid crystal display device of the second embodiment from the first embodiment illustrated in FIG. 1 is that the underlayer forms a portion of the lower substrate, that the cholesteric liquid crystal layer functions as a white color reflective film, and that a pigment color filter layer is arranged.

Referring to FIG. 9, a liquid crystal display device 50 of this embodiment includes an underlayer 56 formed of a portion of the lower substrate 23 and having a plurality of unflat portions formed of curved surfaces on the inner surface of the lower substrate 23 fabricated of a light transmissive material such as glass or plastic. A transflective layer 55 is deposited on the underlayer 56. The transflective layer 55 formed of a plurality of cholesteric liquid crystal layers having different helical pitches of the liquid crystal molecules thereof converges the reflected light in a direction approximately normal to the substrate and has a plurality of unflat portions formed of curved surfaces. Arranged on the transflective layer 55 is a pigment color filter layer 32 composed of color layers 31r, 31g, and 31b of different colors of R, G, and B.

A method of forming the underlayer 56 and the transflective layer 55 on the inner surface of the lower substrate 23 is discussed. This method is a portion of the manufacturing process of the liquid crystal display device 50 of this embodiment shown in FIG. 9.

A photosensitive resist is applied on the lower substrate 23 and is subjected to a pre-firing process. An exposure process is performed on the photosensitive resist using a mask, and is then developed using a developer. A firing process is performed on the photosensitive resist to fully cure the photosensitive resist. Thus, a resist pattern having an aperture corresponding to a position of the formation area of the unflat portions.

A protective laminate film is glued on the surface of the lower substrate 23 opposite from the surface of the lower substrate 23 bearing the resist pattern, and is immersed into a solution supersaturated with the composition of the lower substrate 23 to form miniature projections on the formation area of the unflat portions.

The resist pattern is peeled off, and the lower substrate 23 is then subjected to an etching process in a solution containing hydrogen fluoride as a major content. The smoothed surface is formed on a portion covered with the resist pattern while unflat portions are formed on a portion not covered with the resist pattern. The underlayer 56 having the unflat portions thus results.

A cholesteric liquid crystal is applied on the underlayer 56, and is then irradiated with ultraviolet to cure itself. The cholesteric liquid crystal layer having a plurality of unflat portions formed of the curved surfaces corresponding to the unflat portions of the underlayer 56 is thus obtained. The transflective layer 55 thus results.

When the underlayer 56 is formed of a portion of the lower substrate, the underlayer 56 having the plurality of unflat portions may be produced using a sand blasting process instead of the above method.

The principle of the liquid crystal display device 50 to provide image display has already been discussed in detail in the Summary of the Invention section of this application, and no further discussion thereof is provided here. In this embodiment of the liquid crystal display device 50, the effect that the circularly polarized light transmitted through the transflective layer 55 formed of the cholesteric liquid crystal layers is fully taken advantage of is combined with the effect that the circularly polarized light reflected from the transflective layer 55 is reused. The lightness level in the display caused by the transmitted light is heightened while the lightness level in the display caused by the reflected light is maintained. The transflective-type liquid crystal display device providing an excellent visibility results.

The liquid crystal display device 50 of this embodiment employs the reflective layer of the cholesteric liquid crystal layer exhibiting a sharp directivity in the reflected light. However, the cholesteric liquid crystal layer has a plurality of unflat portions. The elliptically polarized light having a predetermined rotation direction is scattered when being reflected from the transflective layer 55. Compared with the related art liquid crystal display device having no unflat portion on the cholesteric liquid crystal layer, the intensity distribution of the reflected light becomes milder. As a result, the liquid crystal display device 50 provides an excellent visibility with a bright display in a wide viewing angle range.

In the liquid crystal display device 50, the plurality of unflat portions forming the cholesteric liquid crystal layer has a curved surface. When light is reflected from the transflective layer 55, the light reflected therefrom is scattered more efficiently. As a result, a bright display is presented in a wide viewing angle.

The transflective layer 55 thus efficiently converges the reflected light in a direction generally normal to the surface of the substrate (namely, a direction facing the front of the viewer). The ratio of light amount reflected in a direction other than a direction in which the viewer views becomes small. The liquid crystal display device 50 thus presents a brighter and more visible display.

Since the underlayer 56 having the plurality of unflat portions is arranged beneath the cholesteric liquid crystal layer in the liquid crystal display device 50 of this embodiment as well, on the side of the lower substrate 23, the cholesteric liquid crystal layer having the plurality of unflat portions is easily formed.

In the liquid crystal display device 50 of this embodiment, the pigment color filter layer 32 having a plurality of color layers of different color pigments is arranged above the transflective layer 55. A color display is thus presented.

Electronic apparatus

Electronic apparatus incorporating one of the liquid crystal display devices of the above embodiments are discussed below.

Figure 6:
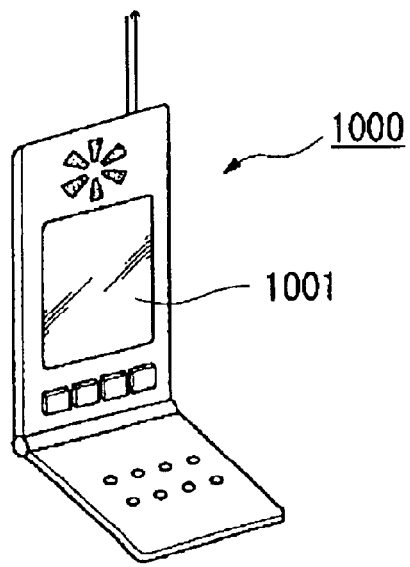
FIG. 6 is a perspective view of one example of the electronic apparatus of the present invention.

FIG. 6 is a perspective view of a mobile telephone. FIG. 6 shows a mobile telephone body 1000, and a liquid crystal display 1001 incorporating the above liquid crystal display device.

Figure 7:
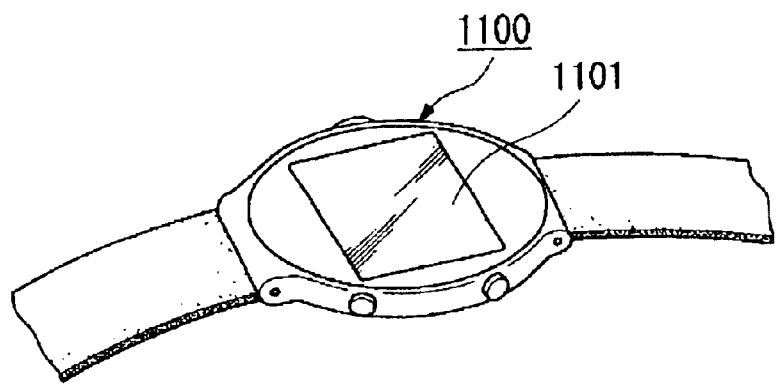
FIG. 7 is a perspective view of another example of the electronic apparatus of the present invention.

FIG. 7 is a perspective view of a wristwatch, as one example of the electronic apparatus. FIG. 7 shows a wristwatch body 1100, and a liquid crystal display 1101 incorporating the above-referenced liquid crystal display device.

Figure 8:
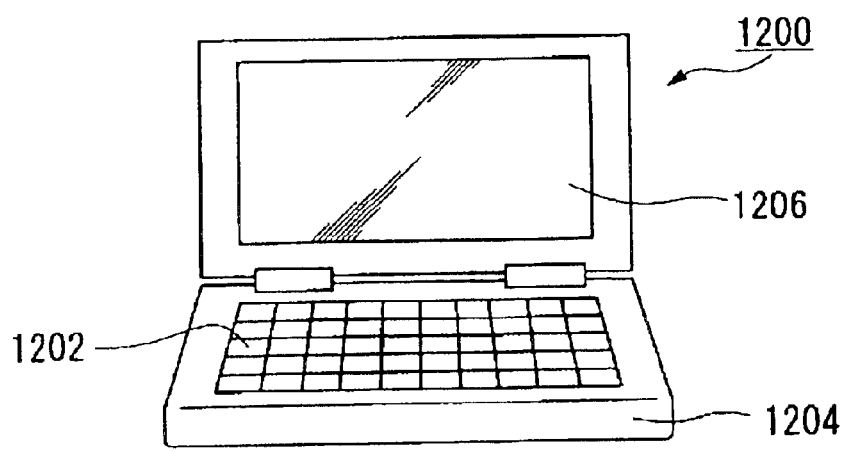
FIG. 8 is a perspective view of yet another example of the electronic apparatus of the present invention.

FIG. 8 is a perspective view of one example of a mobile information processing device such as a word processor or a personal computer. FIG. 8 shows an information processing device 1200, an input device 1202 such as a keyboard, an information processing device main unit 1204, and a liquid crystal display 1206 incorporating the above-referenced liquid crystal display device.

Since the electronic apparatus shown in FIG. 6 through FIG. 8 includes the liquid crystal display incorporating the above-referenced liquid crystal display device, a bright display is presented. Electronic apparatus incorporating the liquid crystal display having excellent visibility is thus obtained.

The present invention is not limited to the above embodiments, and a variety of modifications is possible without departing from the scope of the present invention. For example, the polarizer and the ¼-wave plate are used as the elliptically-polarized-light input device. Other optical members may be used as long as these can introduce the visibility polarized light to the liquid crystal layer.

Ideally, the circularly polarized light is introduced to the liquid crystal layer to provide image display. The present invention is not limited to the completely circularly polarized light. If a slight drop in the utilization of light is acceptable, the elliptically polarized light may be used.

Advantages

Since the liquid crystal display device of the present invention includes the cholesteric liquid crystal layer having the plurality of unflat portions as already discussed, the elliptically polarized light having a predetermined rotation direction is scattered when being reflected and output from the reflective layer. Compared with the related art liquid crystal display device with the cholesteric liquid crystal layer having no unflat portions, the liquid crystal display device of the present invention results in a mild intensity distribution of the reflected light. As a result, the liquid crystal display device with excellent legibility presenting a bright display in a wide viewing angle is obtained.

What is claimed is:

1. A liquid crystal display device, comprising:
    a liquid crystal cell including an upper substrate, a lower substrate facing the upper substrate, and a liquid crystal layer encapsulated between the upper substrate and the lower substrate, the liquid crystal cell having a display area divided into pixel regions;
    a reflective layer formed of a cholesteric liquid crystal layer arranged on an inner surface of the lower substrate, and having a plurality of unflat portions, to reflect at least a portion of elliptically polarized light having a predetermined rotation direction;
    an upper-substrate side elliptically-polarized-light input device to cause elliptically polarized light to enter the liquid crystal layer from the upper substrate, the liquid crystal layer reversing the component of elliptically polarized light that is incident during one of a selection electric field applied state and a non-selection electric field applied state, and not changing the component of the elliptically polarized light during the other of the selection electric field applied state and the non-selection electric field applied state; and
    a partitioning wall arranged in the reflective layer at a position corresponding to the periphery of at least one of the pixel regions, the partitioning wall being higher in level than a peak of the unflat portion of the cholesteric liquid crystal layer.

2. The liquid crystal display device according to claim 1, the reflective layer converging reflected light in a predetermined angle range.

3. The liquid crystal display device according to claim 1, the unflat portion of the cholesteric liquid crystal layer being formed of a curved surface.

4. The liquid crystal display device according to claim 1, further comprising an underlayer having a plurality of unflat portions, beneath the cholesteric liquid crystal layer, on the side of the lower substrate.

5. The liquid crystal display device according to claim 4, the underlayer being fabricated of a resin.

6. The liquid crystal display device according to claim 1, further comprising a color filter layer having a plurality of color layers containing pigments of different colors, over the reflective layer, on the side of the upper substrate.

7. The liquid crystal display device according to claim 1, further comprising an illumination device to cause light to enter the liquid crystal cell from the lower substrate, and a lower-substrate side elliptically-polarized-light input device to cause elliptically polarized light to enter the liquid crystal layer from the lower substrate.

8. The liquid crystal display device according to claim 1, the cholesteric liquid crystal layer functioning as a color filter that selectively reflects color light rays having different wavelengths corresponding to helical pitches of liquid crystal molecules for the pixel regions into which the display area of the liquid crystal cell is divided.

9. The liquid crystal display device according to claim 8, wherein the partitioning wall partitions the cholesteric liquid crystal layer at every helical pitch of liquid crystal molecules.

10. The liquid crystal display device according to claim 1, the reflective layer including a plurality of cholesteric liquid crystal layers having different helical pitches of the liquid crystal molecules.

11. Electronic apparatus, comprising:

the liquid crystal display device according to claim 1.

12. The liquid crystal display device according to claim 1, wherein the partition wall has a grid shape as viewed in plan, the partition wall dividing the reflective layer into a plurality of pixel sections.

13. A liquid crystal display device, comprising:

a liquid crystal cell including a first substrate, a second substrate facing the first substrate, and a liquid crystal layer encapsulated between the first substrate and the second substrate;

a reflective layer formed of a cholesteric liquid crystal layer arranged on an inner surface of the second substrate, and having a plurality of unflat portions, to reflect at least a portion of elliptically polarized light having a predetermined rotation direction;

a color filter layer having a plurality of color layers containing pigments of different colors, the color filter layer being interposed between the liquid crystal layer and the reflective layer; and a first substrate side elliptically polarized light input device to cause elliptically polarized light to enter the liquid crystal layer from the first substrate, the liquid crystal layer reversing the component of elliptically polarized light that is incident during one of a selection electric field applied state and a non-selection electric field applied state, and not changing the component of the elliptically polarized light during the other of the selection electric field applied state and the non-selection electric field applied state.

14. The liquid crystal display device according to claim 13, wherein the color filter layer is formed directly on the reflective layer.

* * * * *

UNITED STATES PATENT AND TRADEMARK OFFICE
CERTIFICATE OF CORRECTION

PATENT NO.    : 6,833,892 B2
DATED         : December 21, 2004
INVENTOR(S)   : Kimitaka Kamijo It is certified that error appears in the above-identified patent and that said Letters Patent is hereby corrected as shown below:

Title page,
Item [54], Title, please change "LIQUID CRYSTAL DISPLAY DEVICE AND ELECTRONIC APPARATUS" to -- LIQUID CRYSTAL DISPLAY DEVICE AND ELECTRONIC APPARATUS HAVING UNFLAT CHOLESTERIC LIQUID CRYSTAL REFLECTIVE LAYER --

Signed and Sealed this

Seventh Day of June, 2005

JON W. DUDAS
*Director of the United States Patent and Trademark Office*